(12) United States Patent
Chen et al.

(10) Patent No.: US 9,286,255 B2
(45) Date of Patent: Mar. 15, 2016

(54) MOTHERBOARD

(71) Applicant: ScienBiziP Consulting (Shen Zhen) Co., Ltd., Shenzhen (CN)

(72) Inventors: Chun-Sheng Chen, New Taipei (TW); Jing Wang, Wuhan (CN)

(73) Assignee: ScienBiziP Consulting(Shenzhen)Co., Ltd., Shenzhen (CN)

(*) Notice: Subject to any disclaimer, the term of this patent is extended or adjusted under 35 U.S.C. 154(b) by 198 days.

(21) Appl. No.: 14/139,161

(22) Filed: Dec. 23, 2013

(65) Prior Publication Data
US 2014/0177191 A1 Jun. 26, 2014

(30) Foreign Application Priority Data
Dec. 26, 2012 (CN) .................... 2012 1 0570920

(51) Int. Cl.
*G06F 13/14* (2006.01)
*G06F 13/40* (2006.01)

(52) U.S. Cl.
CPC ............ *G06F 13/40* (2013.01); *G06F 13/4022* (2013.01); *G06F 13/4068* (2013.01); *G06F 2213/0026* (2013.01); *G06F 2213/0032* (2013.01)

(58) Field of Classification Search
None
See application file for complete search history.

(56) References Cited

U.S. PATENT DOCUMENTS

| | | | | |
|---|---|---|---|---|
| 9,141,152 B2* | 9/2015 | Gay | .................... | G06F 1/187 |
| 2006/0282594 A1* | 12/2006 | Motoe | .................. | G06F 13/409 |
| | | | | 710/301 |
| 2008/0256283 A1* | 10/2008 | Chiu | ..................... | G06F 13/385 |
| | | | | 710/306 |
| 2010/0049878 A1* | 2/2010 | Yu | ......................... | G06F 13/385 |
| | | | | 710/11 |
| 2012/0033370 A1* | 2/2012 | Reinke | .................... | G06F 1/185 |
| | | | | 361/679.4 |
| 2012/0059977 A1* | 3/2012 | Chuang | ............... | G06F 13/1684 |
| | | | | 711/103 |
| 2012/0262874 A1* | 10/2012 | Sun | ........................ | G06F 1/189 |
| | | | | 361/679.33 |
| 2014/0082258 A1* | 3/2014 | Ober | ....................... | G06F 3/061 |
| | | | | 711/103 |

OTHER PUBLICATIONS

Okio, "Special for Notebook, Recognizing mSATA SSD", http://www.tpuser.idv.tw/wp/?p=1509, pp. 1-16, Jan. 21, 2012, Taiwan.

* cited by examiner

*Primary Examiner* — Elias Mamo
(74) *Attorney, Agent, or Firm* — Novak Druce Connolly Bove + Quigg LLP

(57) ABSTRACT

A motherboard includes a platform controller hub (PCH) chip, a connector, and a switch chip. The PCH chip includes a first group of pins and a second group of pins. The switch chip is connected to either the first group of pins or the second group of pins according to a type of a card connected to the connector.

2 Claims, 2 Drawing Sheets

MOTHERBOARD

BACKGROUND

1. Technical Field

The present disclosure relates to a motherboard.

2. Description of Related Art

In an all-in-one computer (shown as FIG. 2), a platform controller hub (PCH) chip 130 of a printed circuit board (PCB) includes a first group of pins 140 to be connected to a first mini card connector 110, and a second group of pins 150 to be connected to a second mini card connector 120. A mini serial advanced technology attachment (mSATA) card 100 is plugged into the first mini card connector 110 to connect to the PCH chip 130, and a mini peripheral component interconnect express (mini-PCIe) card 200 is plugged into a second mini card connector 120 to connect to the PCH chip 130. Thus, the mini-PCIe card 200 and the mSATA card 100 need separate connectors to connect to the PCH chip 130, which increases a cost of the PCB.

Therefore, there is room for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
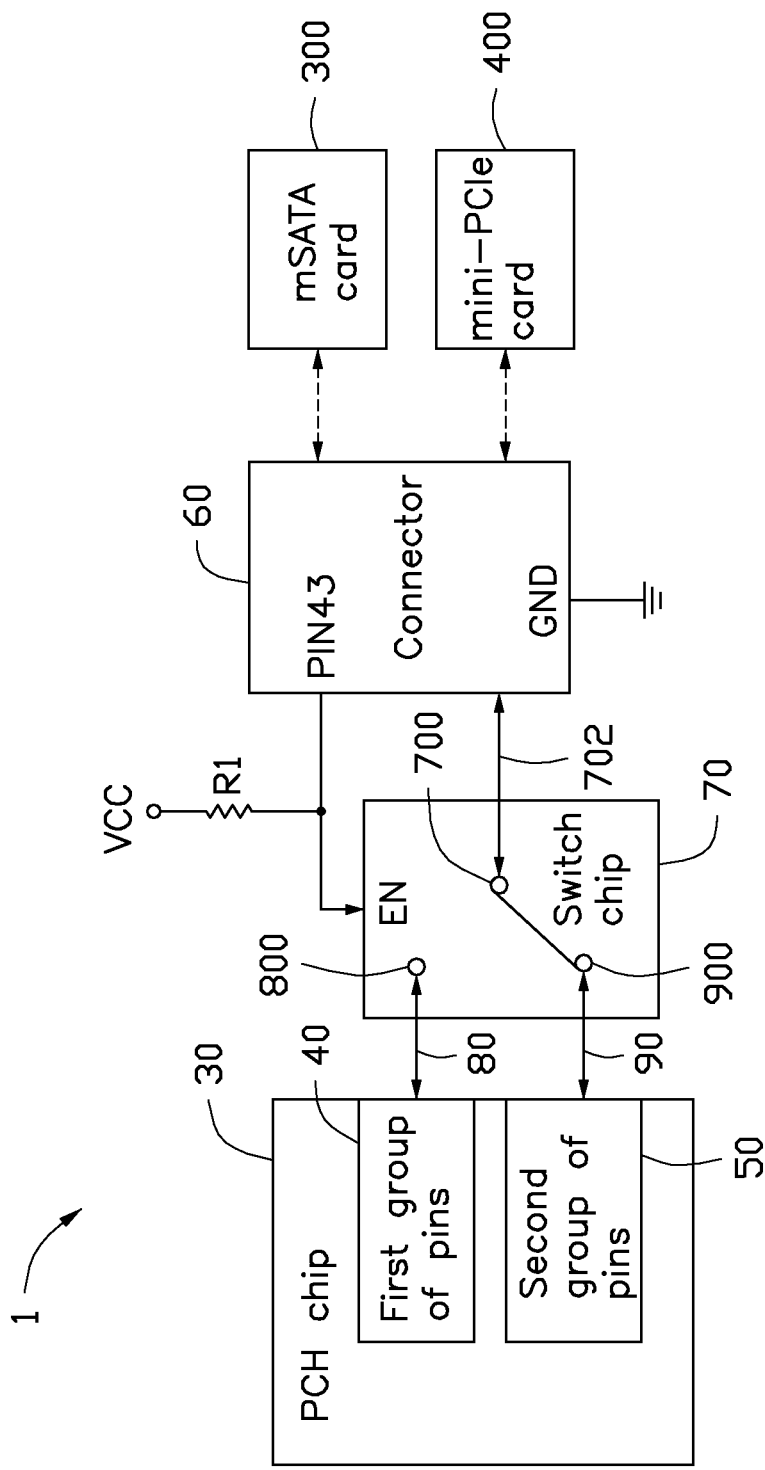
FIG. 1 is a block diagram of an embodiment of a motherboard.
Figure 2:
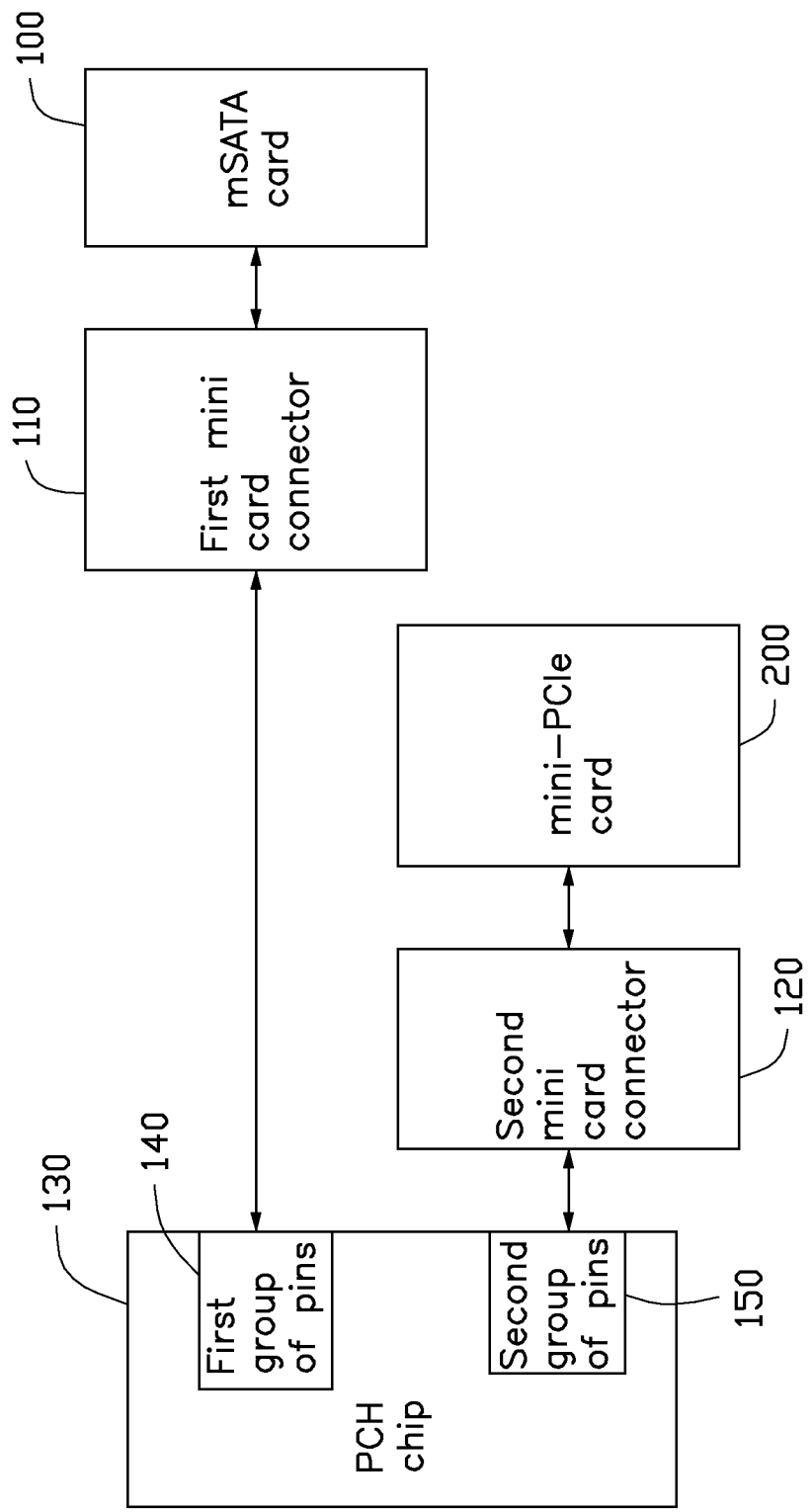
FIG. 2 is a block diagram of an embodiment of a motherboard of the related art.

FIG. 1 illustrates an embodiment of a motherboard 1. The motherboard 1 comprises a platform controller hub (PCH) chip 30, a connector 60, a switch chip 70, and a resistor R1.

The PCH chip 30 comprises a first group of pins 40 suitable for being connected to an mSATA card 300, and a second group of pins 50 suitable for being connected to a mini-PCIe card 400.

In one embodiment, the connector 60 serves as either an mSATA connector or as a mini-PCIe connector. According to the specifications of an mSATA connector and a mini-PCIe connector, the mSATA connector and the mini-PCIe connector have the same number of pins, except for a detail definitions of certain pins, such as the PIN43. The PIN 43 of the mSATA connector is idle, and the PIN 43 of the mini-PCIe connector is connected to ground. The connector 60 comprises a PIN43, which connects to either the mSATA card 300 or the mini-PCIe card 400.

The switch chip 70 comprises an enable pin EN. The connector 60 comprises a ground pin GND and a predefined pin PIN43. The predefined pin PIN43 is connected to the enable pin EN of the switch chip 70. The predefined pin PIN43 is further coupled to a power terminal VCC through the resistor R1. The ground pin GND is connected to ground, such as being connected to a ground layer of the motherboard 1.

The switch chip 70 further comprises a first transmission group of pins 800 connected to the first group of pins 40 of the PCH chip 30 through a first bus 80, a second transmission group of pins 900 connected to the second group of pins 50 of the PCH chip 30 through a second bus 90, and a third transmission group of pins 700 connected to the connector 60 through a third bus 702. The switch chip 70 enables the third transmission group of pins 700 to be connected to either the first transmission group of pins 800 or the second transmission group of pins 900 according to a voltage of the enable pin EN.

When the mSATA card 300 is plugged into the connector 60, the predefined pin PIN43 of the connector 60 is connected to the mSATA card 300. Accordingly, the enable pin EN of the switch chip 70 is at a high-voltage level, such as logic 1, and the switch chip 70 enables the third transmission group of pins 700 to be connected to the first transmission group of pins 800, thereby allowing the mSATA card 300 to connect to the PCH chip 30.

When the mini-PCIe card 400 is plugged into the connector 60, the predefined pin PIN43 of the connector 60 is connected to the mini-PCIe card 400. Accordingly, the enable pin EN of the switch chip 70 is at a low-voltage level, such as logic 0, and the switch chip 70 enables the third transmission group of pins 700 to be connected to the second transmission group of pins 900, thereby allowing the mini-PCIe card 400 to connect to the PCH chip 30.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A motherboard, comprising:
    a platform controller hub (PCH) chip comprising a first group of pins and a second group of pins;
    a connector comprising a predefined pin and a ground pin, and operable of being connected to either a mini peripheral component interconnect express (mini-PCIe) card or a mini serial advanced technology attachment (mSATA) card; and
    a switch chip comprising a first transmission group of pins, a second transmission group of pins, a third transmission group of pins, and an enable pin coupled to the predefined pin of the connector, wherein the first transmission group of pins are coupled to the first group of pins through a first bus, the second transmission group of pins are coupled to the second group of pins through a second bus, the third transmission group of pins are coupled to the third group of pins through a third bus;
    wherein when the connector is connected to the mSATA card, the switch chip enables the third transmission group of pins to be connected to the first transmission group of pins; when the connector is connected to the mini-PCIe card, the switch chip enables the third transmission group of pins to be connected to the second transmission group of pins.

2. The motherboard of claim 1, wherein the enable pin of the switch chip further is coupled to a power terminal through a resistor.

* * * * *